United States Patent [19]
Walsh et al.

[11] Patent Number: 5,329,521
[45] Date of Patent: Jul. 12, 1994

[54] METHOD AND APPARATUS FOR REDUNDANT LOCAL AREA NETWORK SYSTEMS

[76] Inventors: Jeffrey R. Walsh, 4203 Ravenhurst Cir., Glen Arm, Md. 21057; David W. Barrett, 4209 Beckleysville Rd., Hampstead, Md. 21074

[21] Appl. No.: 975,315

[22] Filed: Nov. 12, 1992

[51] Int. Cl.$^5$ .............................................. H04J 1/16
[52] U.S. Cl. ................................... 370/16; 370/85.3; 371/8.2
[58] Field of Search ............... 370/13, 16, 16.1, 85.1, 370/85.3, 85.9, 85.12, 85.14; 340/825.01; 371/8.1, 8.2, 11.1–11.3; 455/8; 375/38

[56] References Cited

U.S. PATENT DOCUMENTS

| | | | |
|---|---|---|---|
| 4,575,842 | 3/1986 | Katz et al. | |
| 4,627,045 | 12/1986 | Colson et al. | 371/8.2 |
| 4,635,254 | 1/1987 | Tulpule et al. | 370/85.1 |
| 4,748,560 | 5/1988 | Kataoka | 370/85.9 |
| 5,056,090 | 10/1991 | Kubota | 371/8.2 |
| 5,086,499 | 2/1992 | Mutone | 371/8.1 |
| 5,153,874 | 10/1992 | Kohno | 370/13 |
| 5,200,949 | 4/1993 | Kobayashi | 370/16 |

OTHER PUBLICATIONS

Article by Wayne M. Adams and Geoffrey J. Trotter, "DECnet/Ethernet: Today and Tomorrow on the Plant Floor", published in Control Engineering, Oct. 2, 1987, pp. 32–35.
Requirements Document by Dan LeBlanc and Dennis Tompkins, "CIM Product Requirements for a Redundant Ethernet Adaptor Option", Digital Equipment Corporation Proposal, Dec. 7, 1988, pp. 1-B4.

Primary Examiner—Douglas W. Olms
Assistant Examiner—Chau T. Nguyen
Attorney, Agent, or Firm—Robert L. Troike; Richard L. Donaldson

[57] ABSTRACT

A local area network system is provided in which a plurality of communications nodes (14 and 16) are operable to transmit and receive information across a plurality of communications links (10 and 12). A plurality of redundant adapters (18 and 20) are coupled between the communications links (10 and 12) and the communications nodes (14 and 16), such that the communications nodes (14 and 16) are capable of transmitting and receiving information across each of the communications links (10 and 12).

12 Claims, 2 Drawing Sheets

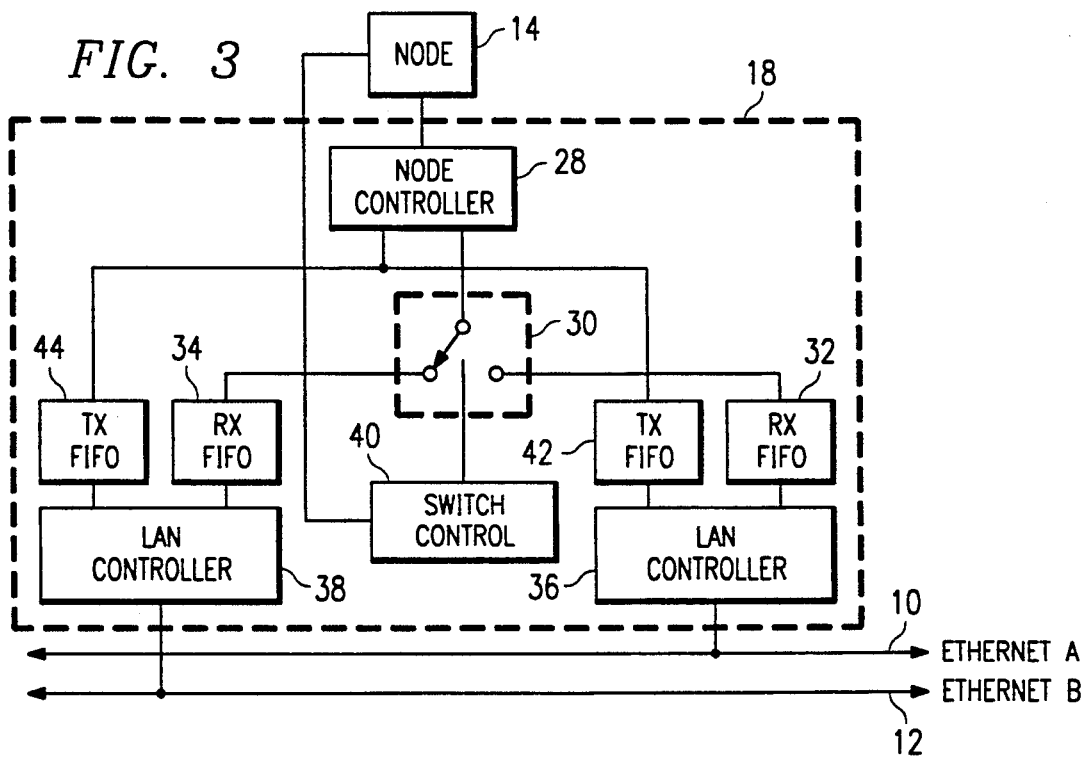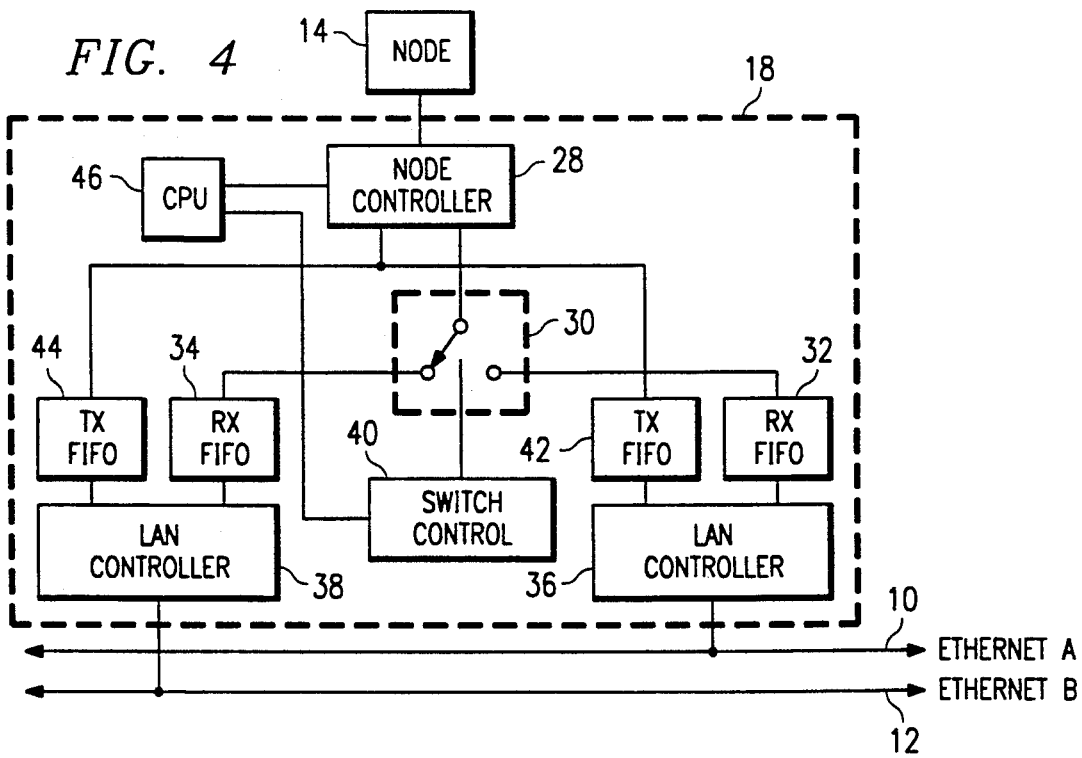

METHOD AND APPARATUS FOR REDUNDANT LOCAL AREA NETWORK SYSTEMS

TECHNICAL FIELD OF THE INVENTION

This invention relates generally to the field of electronic data communications, and more particularly to a method and apparatus for redundant local area network systems.

BACKGROUND OF THE INVENTION

Local area network systems, such as Ethernet systems, have become popular in both office and industrial environments. Such systems use bus structured architectures which allow a plurality of nodes to communicate across the area network. The communications are transmitted across such cables as coaxial, fiber optic and shielded twisted-pair.

Because of the critical nature of communication between devices in certain applications, such as in the process industry, it is often necessary to provide redundant communications media to insure communications in the event that one communication path fails. In systems such as Ethernet systems, redundant communication paths are feasible only if all communications nodes contain at least one Ethernet controller for each communication path, and if the nodes have routing capability. Routing capability is a protocol which requires each node to make decisions about which path to use for communication with an adjacent node. In existing systems, not all nodes are capable of routing, and many do not support multiple Ethernet interfaces.

Therefore, a need has arisen for a method and apparatus that allows devices without routing capability and those without sufficient communication controllers to be adapted to communicate over redundant paths.

SUMMARY OF THE INVENTION

In accordance with the present invention, a method and apparatus for redundant local area network systems is provided which substantially eliminates or reduces disadvantages and problems associated with prior art systems. In particular, a local area network system is disclosed which includes a plurality of communications nodes operable to transmit and receive information, and a plurality of communications links coupled to the communications nodes for transmission of information between the communications nodes. Furthermore, a plurality of redundant adapters are coupled between the communications links and the communications nodes, such that the communications nodes are capable of transmitting and receiving information across each of the communications links.

In a particular embodiment, each of the redundant adapters includes a plurality of local area network controllers, each of which is operable to transmit and receive information from a single communications link. A node controller transmits and receives information between a communications node to which the redundant adapter is coupled and the local area network controllers. A processor coupled to the controllers is operable to control the controller such that the communications node to which the redundant adapter is coupled receives only the information containing the least transmissions errors.

In still another embodiment, a switch is coupled between the node controller and the local area network controllers, such that the node controller receives information from only one of the local area network controllers at any one time.

An important technical advantage of the present invention is the fact that it allows communications nodes otherwise unable to operate in redundant systems to operate in such redundant systems.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein:

FIG. 3 illustrates a block diagram of another embodiment of a communications system including a redundant adapter according to the teachings of the present invention; and FIG. 4 illustrates a block diagram of another embodiment of a communications system including a redundant adapter according to the teachings of the present invention.

DETAILED DESCRIPTION OF THE INVENTION

The preferred embodiments of the present invention are illustrated in FIGS. 1 through 4 of the drawings, like numerals being used to refer to like and corresponding parts of the various drawings.

In the following description, the present invention will be discussed in connection with an Ethernet local area network system. It should be understood that this is for purposes of clarity only, and that other local area networks may be used without departing from the intended scope of the present invention.

Figure 1:
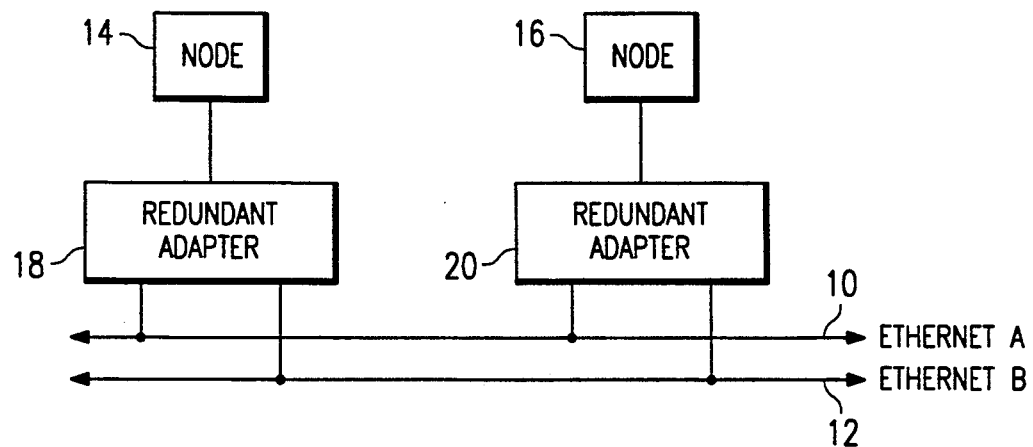
FIG. 1 illustrates a block diagram of a communications system including redundant adapters according to the present invention.

FIG. 1 illustrates a local area network system having redundant communication links 10 and 12. In the particular embodiment illustrated, these links comprise two Ethernet communication links, Ethernet A and Ethernet B. As discussed previously, examples of such links include coaxial links, fiber optic links, and shielded twisted-pair links.

Two communications nodes, nodes 14 and 16, are coupled to links 10 and 12. Nodes 14 and 16 are coupled to links 10 and 12 through redundant adapters 18 and 20, respectively.

As can be seen in FIG. 1, nodes 14 and 16, in and of themselves, support only one communication link each. Thus, these nodes do not have the capability of coupling directly to links 10 and 12, since they have only one communications port each. Therefore, they are coupled to links 10 and 12 through the redundant adapters 18 and 20 to allow for communication over both links 10 and 12.

It should be understood that only two communication links 10 and 12 are shown for clarity, and that more redundancy may be used without departing from the intended scope of the present invention. For example, three links, rather than two, could be used for deeper redundancy. In that case, the redundant adapters would adapt each of the communications nodes to each of the links.

Figure 2:
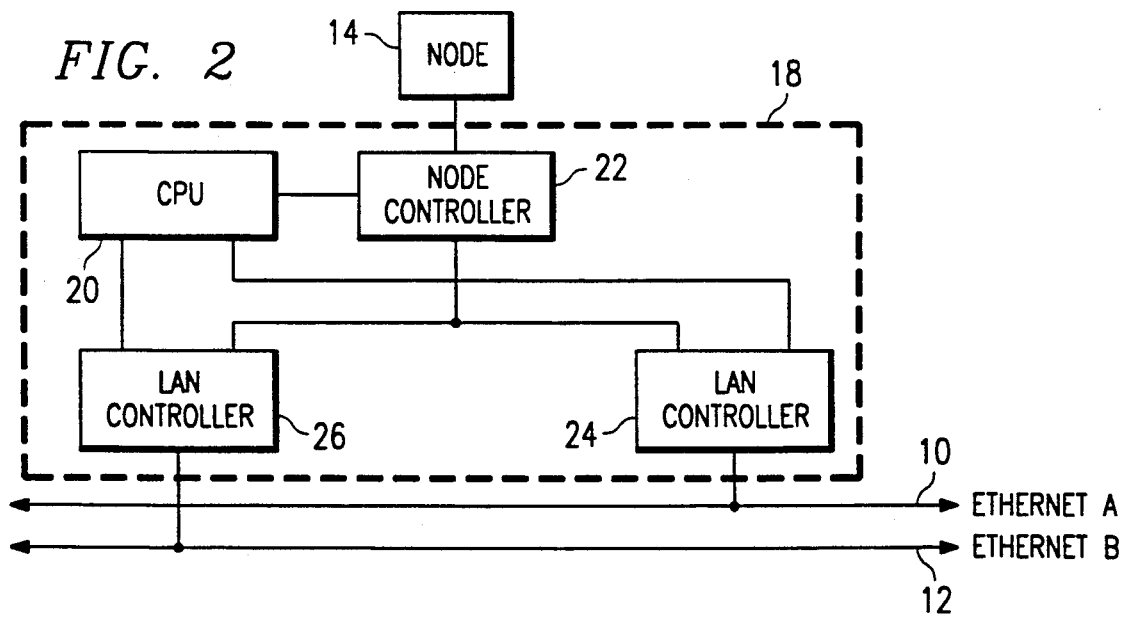
FIG. 2 illustrates a block diagram of a particular embodiment of a communications system including a redundant adapter according to the teachings of the present invention.

FIG. 2 illustrates a block diagram of redundant adapter 18 and its interconnection with node 14 and links 10 and 12. In particular, redundant adapter 18 includes a processor (CPU 20), a node controller 22, and local area network controllers 24 and 26. Node controller 22 is a local area network controller, but will be referred to as a node controller, as it controls communication to and from node 14. Node Controller 22 is coupled to node 14 and to local area network controllers 24 and 26. Local area network controllers 24 and 26 are coupled to links 10 and 12, respectively. CPU 20 is coupled to controllers 22, 24, and 26.

In the embodiment shown in FIG. 2, redundant adapter 18 transmits messages from node 14 over both links 10 and 12. In this transmit mode, messages are buffered by the redundant adapter 18 and transmitted when the channel is clear. When receiving messages, redundant adapter 18 listens to messages from both links 10 and 12, but forwards only one message to destination node 14. CPU 20 decides which of these messages to forward onto node 14. To accomplish this, CPU 20 determines the status of each link 10 and 12, by, for example keeping a log of the received messages, and controlling node controller 22 such that only the messages with the least errors, and no duplicative messages, are forward onto node 14.

FIG. 3 illustrates another embodiment of redundant adapter 18 according to the teachings of the present invention. As shown in FIG. 3, redundant adapter 18 couples node 14 to links 10 and 12. Redundant adapter 18 incudes a node controller 28 coupled to a switch 30. Switch 30 is coupled to receive FIFOs 32 and 34. Receive FIFOs 32 and 34 are coupled to local area network controllers 36 and 38 respectively. Local area network controllers 36 and 38 are coupled to links 10 and 12, respectively. Switch 30 is also coupled to a switch controller 40. Furthermore, transmit FIFOs 42 and 44 are coupled between node controller 28 and local area network controllers 36 and 38. Switch controller 40 is also coupled to node 14.

In operation, messages transmitted by node 14 are transmitted onto both links 10 and 12 by node controller 28 through transmit FIFOs 42 and 44 and local area network controllers 36 and 38. As for messages being received by node 14, local area network controllers 36 and 38 receive the messages from links 10 and 12, respectively.

These received messages are then buffered in receive FIFOs 32 and 34. Depending on the state of switch 30, either receive FIFO 32 or receive FIFO 34 is coupled to node controller 28. Thus, for example, with the switch 30 shown in the position shown in FIG. 3, messages will be transmitted to node 14 from node controller 28 and through switch 30 from receive FIFO 34. The position of switch 30 is controlled by switch controller 40. Switch controller 40 is in turn controlled by node 14.

The switch 30 will be placed in one position, and messages will be received from the appropriate receive FIFO 32 or 34, depending on the position of switch 30. If node 14 senses a fault condition, such as a high error rate or no received messages at all, it will control switch controller 40 such that switch 30 is switched to the other position. In this manner, information will be received by node 14 from the non-faulted link 10 and 12. The link between node 14 and switch controller 40 may comprise an RS232 communications link. Software within node 14 is able to detect the fault condition so as to initiate the switching.

FIG. 4 illustrates another embodiment of redundant adapter 18 according to the teachings of the present invention. As shown in FIG. 4, no link exists between node 14 and switch controller 40. Rather, a processor, CPU 46, is included within redundant adapter 18. As shown in FIG. 4, CPU 46 is coupled to node controller 28. CPU 46 is able to detect error conditions, for example by using error registers within node controller 28 or by analyzing the data received by node controller 28. If CPU 46 detects an error condition, it instructs switch controller 40 to switch the position of switch 30, such that data received by node 14 will be received over the other link 10 or 12.

In summary, a method and apparatus for redundant local area network adaptation is provided whereby communication nodes otherwise capable of only communicating with a single network link may be coupled to redundant network links for redundant communication applications.

Although the present invention has been described in detail, it should be understood that various changes, substitutions and alterations can be made without departing from the spirit and scope of the invention as defined solely by the appended claims.

What is claimed is:

1. A local area network system, comprising:
 a plurality of communications nodes operable to transmit and receive information conveying data signals;
 a plurality of communications links for transmission of said information conveying data signals between said plurality of communications nodes; and
 a plurality of redundant adapters each of which is coupled between one of said plurality of communications nodes and said plurality of communications links such that said one of said plurality of communications nodes is capable of transmitting and receiving said information conveying signals across each of said plurality of communications links, each of said plurality of redundant adapters including:
  a plurality of local area network controllers, each of said plurality of local area network controllers operable to transmit and receive said information conveying data signals from one of said plurality of communications links;
  a node controller coupled to said each of said plurality of local area network controllers and said one of said plurality of communications nodes operable to transmit and receive said information conveying data signals between said one of said plurality of communications nodes to which said node controller is coupled and said plurality of local area network controllers; and
  a processor coupled to said node controller and said each of said plurality of local area network controllers and operable to control said node controller and said each of said plurality of local area network controllers such that said one of said plurality of communications nodes receives only said information conveying data signals that include the least transmissions errors.

2. The local area network system of claim 1, wherein said local area network is an Ethernet network.

3. A local area network system, comprising:

a plurality of communications nodes operable to transmit and receive information conveying data signals;

a plurality of communications links for transmission of said information conveying data signals between said plurality of communications nodes; and a plurality of redundant adapters each of which is coupled between one of said plurality of communications nodes and said plurality of communications links such that said one of said plurality of communications nodes is capable of transmitting and receiving said information conveying signals across each of said plurality of communications links, each of said plurality of redundant adapters including:

a plurality of local area network controllers, each of said plurality of local area network controllers operable to transmit and receive said information conveying data signals from one of said plurality of communications links;

a node controller coupled to said each of said plurality of local area network controllers and said one of said plurality of communications nodes operable to transmit and receive said information conveying data signals between said one of said plurality of communications nodes to which said node controller is coupled and said plurality of local area network controllers; and a switch coupled between said node controller and said plurality of local area network controllers such that said node controller receives said information conveying data signals from only one of said plurality of local area network controllers at any one time.

4. The local area network system of claim 3, wherein said switch is controlled by said one of said plurality of communications nodes to which said each of said plurality of redundant adapters is coupled, such that said one of said plurality of communications nodes to which said each of said plurality of redundant adapters is coupled receives only said information conveying data signals that include the least transmission errors.

5. The local area network system of claim 4, wherein said local area network is an Ethernet network.

6. The local area network system of claim 3, wherein said each of said plurality of redundant adapters further comprises a processor coupled to said switch and operable to control said switch such that said one of said plurality of communications nodes to which said each of said plurality of redundant adapters is coupled receives only said information conveying data signals that include the least transmission errors.

7. The local area network system of claim 6, wherein said local area network is an Ethernet network.

8. A local area network system, comprising:

a plurality of communications nodes operable to transmit and receive information conveying data signals;

a plurality of communications links for transmission of said information conveying data signals between said plurality of communications nodes; and a plurality of redundant adapters each of which is coupled between one of said plurality of communications nodes and said plurality of communications links such that said one of said plurality of communications nodes is capable of transmitting and receiving said information conveying data signals across each of said plurality of communications links, each of said plurality of redundant adapters including:

a plurality of local area network controllers, each of said plurality of local area network controllers operable to transmit and receive said information conveying data signals from one of said plurality of communications links;

a plurality of transmit FIFOs, each of said plurality of transmit FIFOs coupled to one of said plurality of local area network controllers, said each of said plurality of transmit FIFOs for buffering said information conveying data signals transmitted by said one of said plurality of local area network controllers;

a plurality of receive FIFOs, each of said plurality of receive FIFOs coupled to one of said plurality of local area network controllers, said each of said plurality of receive FIFOs for buffering said information conveying data signals received by said one of said plurality of local area network controllers;

a switch;

a node controller coupled to said plurality of transmit FIFOs and said plurality of receive FIFOs via said switch and one of said plurality of communications nodes, said node controller operable to transmit and receive said information conveying data signals between said one of said plurality of communications nodes to which said node controller is coupled and said plurality of transmit FIFOs and said plurality of receive FIFOs; and said switch coupled between said node controller and said plurality of receive FIFOs such that said node controller receives said information conveying data signals from only one of said plurality of local area network controllers at any one time.

9. The local area network system of claim 8, wherein said switch is controlled by said one of said plurality of communications nodes to which said each of said plurality of redundant adapters is coupled, such that said one of said plurality of communications nodes to which said each of said plurality of redundant adapters is coupled receives only said information conveying data signals that include the least transmission errors.

10. The local area network system of claim 9, wherein said local area network is an Ethernet network.

11. The local area network system of claim 8, wherein said each of said plurality of redundant adapters further comprises a processor coupled to said switch and operable to control said switch such that said one of said plurality of communications nodes to which said each of said plurality of redundant adapters is coupled receives only said information conveying data signals that include the least transmission errors.

12. The local area network system of claim 11, wherein said local area network is an Ethernet network.

* * * * *